Dec. 4, 1951  D. FIRTH  2,577,516
LOCKING MEANS FOR ADJUSTING NUTS
Filed Dec. 16, 1946  2 SHEETS—SHEET 1

INVENTOR.
David Firth,
BY Osgood H. Dowell
Atty.

Dec. 4, 1951  D. FIRTH  2,577,516
LOCKING MEANS FOR ADJUSTING NUTS
Filed Dec. 16, 1946  2 SHEETS—SHEET 2
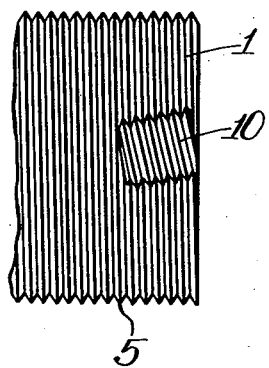
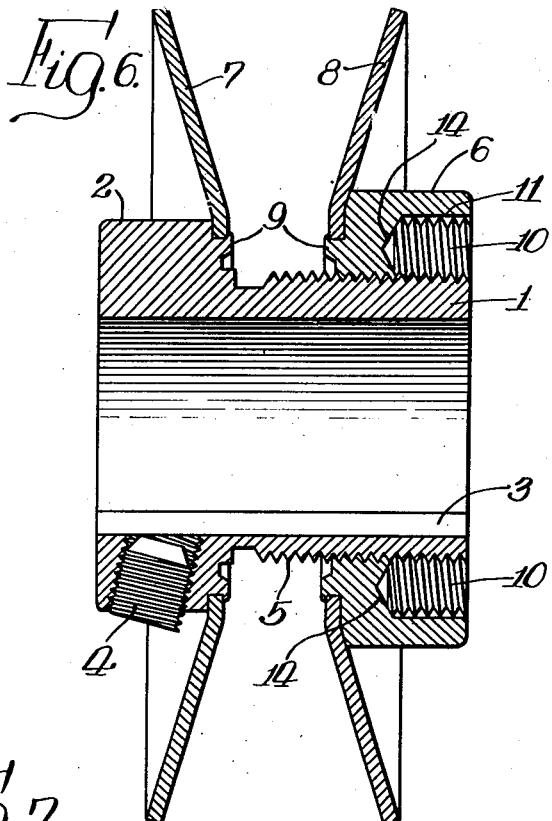
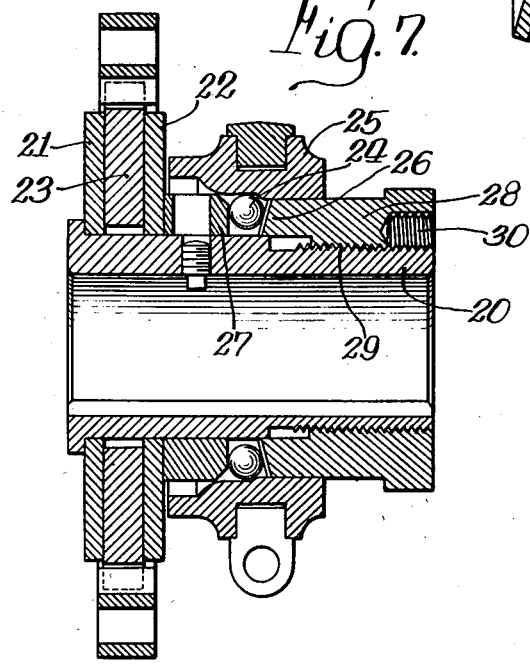
INVENTOR.
David Firth
BY Osgood H. Dowell
Atty.

Patented Dec. 4, 1951

2,577,516

UNITED STATES PATENT OFFICE 2,577,516

LOCKING MEANS FOR ADJUSTING NUTS

David Firth, South Bend, Ind., assignor to Dodge Manufacturing Corporation, Mishawaka, Ind., a corporation of Indiana Application December 16, 1946, Serial No. 716,594

2 Claims. (Cl. 151—70)

1

This invention relates to a means for locking an adjusting nut to the threaded member on which it is screwed. The invention has in view the provision of a simple and practicable means for the indicated purpose, and one by which to obtain effective locking in any angular position of the adjusting nut.

The invention may be utilized for locking the adjusting nut of a variable pitch V-belt sheave or that of a friction clutch or other mechanical device having parts the relative position of which is adjusted by a nut.

In the accompanying drawings:

Fig. 5 is a top plan view of a portion of the threaded sheave hub and locking screw engaging the same, this view showing that the locking screw is arranged in a skewed position.

Fig. 6 is a view similar to Fig. 1 showing the adjusting nut equipped with two diametrically oppositely arranged locking screws.

Fig. 7 is a longitudinal section of a friction clutch having an adjusting nut and locking means therefor embodying the invention.

Figure 1:
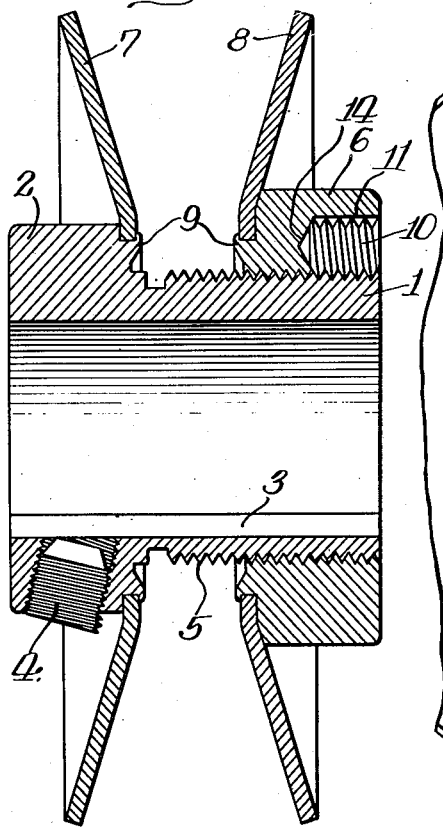
Fig. 1 is a longitudinal section of a variable pitch V-belt sheave having an adjusting nut and locking means therefor embodying the invention.
Figure 2:
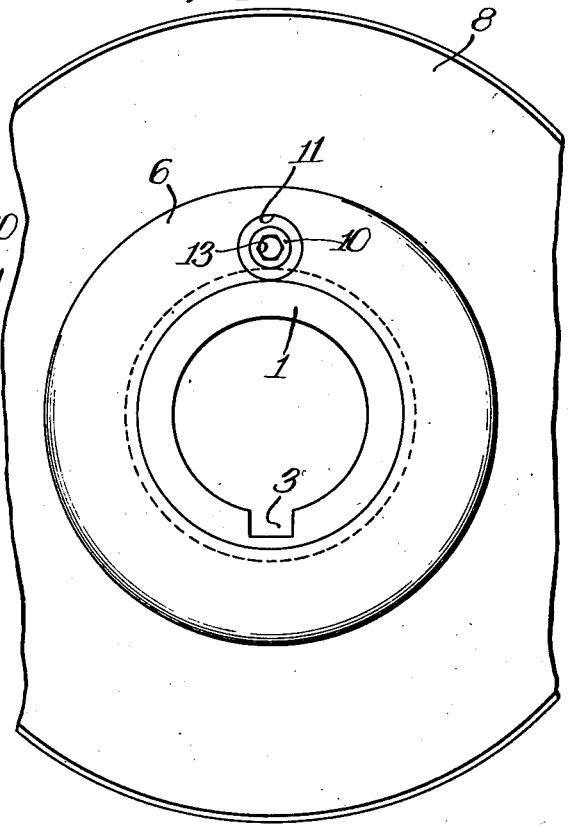
Fig. 2 is an end view of said sheave, parts of the belt-engaging flanges thereof being broken away.

Referring to the sheave shown in Figs. 1 and 2, the hub thereof is provided by a tubular member 1 formed with a large annular flange 2. The hub is bored to fit a shaft and has an internal longitudinal groove 3 for engagement by a key for keying the hub to the shaft. A set screw 4 engaging in a threaded hole therefor in the hub flange 2 is arranged to be tightened against the shaft key for securing the key and hub in fixed relation and against longitudinal movement on the shaft.

The portion of the hub extending from the flange 2 is exteriorly screw threaded as indicated at 5. Screwed thereon is an adjusting nut 6 whose internal screw thread matches the thread of the hub.

Affixed respectively to the hub flange 2 and adjusting nut 6 are the pressed steel annular discs 7 and 8, formed and arranged to provide

2 confronting conical flanges for engagement with the opposite sides of a V-belt. In the specific construction shown, said discs are fitted on the rabbetted adjacent ends of the hub flange and nut and riveted thereto by swaging the annular extremities of the circular bosses 9 against the inner edges of said discs.

The foregoing description of the sheave is merely for explanation of the specific construction shown, which specific construction is immaterial to the invention herein claimed.

By rotating the nut 6 in a direction for screwing it up, the disc 8 can be moved toward the disc 7, whereby the belt engaging the sheave will move outwardly from the sheave center, thus increasing the pitch diameter of the sheave. A reverse adjustment can be effected by rotating the nut in the opposite direction.

For locking the adjusting nut to the hub, a locking screw 10 is employed. The thread of this screw is of the same pitch as the hub thread 5. Said locking screw 10, loosely fitted in a smooth bored hole 11 in the adjusting nut, is disposed longitudinally of the hub in threaded engagement therewith, the locking screw being so centered that the portions of its thread convolutions immediately adjacent to the hub come between successive convolutions of the hub thread. In other words, the thread of the locking screw has its convolutions in mesh with those of the hub thread, so that the two threads are interengaged at longitudinally alined points.

Figure 3:
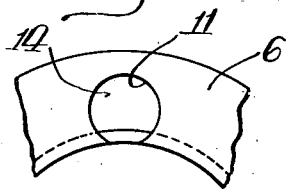
Fig. 3 is an end view of a segment of the adjusting nut, showing the hole therein for the locking screw.

As shown in Fig. 3, the screw hole 11, drilled in the adjusting nut from the outer end thereof, is centered to allow interengagement of the threads of the locking screw and hub in the manner described, the interior wall of said screw hole being interrupted immediately adjacent to the hub by a longitudinal gap accommodating the overlapping portions of the threads of the locking screw and hub. The locking screw is held by the adjusting nut in engagement with the hub thread, the clearance between the locking screw and interior wall of the screw hole 11 being insufficient to allow disengagement of the screw threads by lateral movement of the locking screw.

The locking screw is insertable in place through the outer open end of the screw hole 11. In the outer end of the locking screw is a suitable socket 13 for engagement by a wrench for operating the locking screw.

The screw hole 11 is substantially shorter than the adjusting nut, said screw hole being closed at its inner end by a part of the nut against which the locking screw 10 can be forced by screwing it up in the adjusting nut. As shown, the locking screw has a conical inner end for coaction with a correspondingly conical seat 14 formed in the adjusting nut at the inner end of said screw hole. The conical end of the locking screw can be jammed against said seat 14 in binding engagement therewith.

The locking screw 10, when screwed up tight in the adjusting nut, establishes a rigid locking connection between the nut and hub, by the binding of the interengaging portions of the threads of the locking screw and hub and the tight engagement of the screw with the seat 14 in the nut. By means of said locking screw, the adjusting nut 6 can be locked fast to the nut in any angular position of said nut relative to the hub.

To permit adjusting the adjusting nut, the locking screw must of course be loosened and unscrewed sufficiently to retract it a suitable distance from the seat 14.

As the locking screw 10 is of smaller diameter than the hub, the slant of the thread of said screw is correspondingly greater than that of the thread of the hub. Hence if the locking screw is substantially or approximately parallel with the hub, as represented in Figs. 1 and 2, the portions of the thread of the locking screw between convolutions of the thread of the hub are oblique to the latter. As the locking screw is screwed up in the adjusting nut, it is forcibly skewed by coaction of the interengaging screw threads, tending to assume a position in which the interengaging portions of the screw threads approach parallelism. This causes a binding of the locking screw in the screw hole 11 and a tighter binding of the interengaging portions of the threads of the locking screw and hub, thus increasing the tightness of the connection established by the locking screw between the adjusting nut and hub.

Instead of being arranged substantially parallel with the hub, the locking screw is arranged in such a skewed position as to bring the interengaging portions of the threads of said screw and hub into approximate parallelism. Such a skewed position of the locking screw is represented in Fig. 5, which is a view looking directly down on the threaded hub and showing the locking screw in engagement therewith, omitting the adjusting nut. In Fig. 5 the locking screw is substantially parallel with a horizontal plane but oblique to a vertical plane in which the hub axis lies. It will be understood that the screw hole 11 in the adjusting nut may be appropriately centered to hold the locking screw positioned as shown in Fig. 5.

The arrangement of the locking screw shown in Figs. 1 and 2 gives a tighter binding of interengaging screw threads and of the locking screw in the adjusting nut than the arrangement shown in Fig. 5; however the latter is also efficient and allows a greater contact of overlapping portions of the threads of the locking screw and hub, with consequent less likelihood of damaging the threads by tightening the locking screw.

Figure 4:
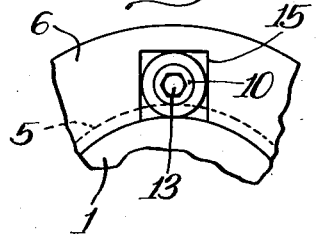
Fig. 4 is a view corresponding to Fig. 3, illustrating a modification with respect to the cross-sectional form of the hole for the locking screw and showing the latter in place.

Instead of the round screw hole 11, there could be employed a screw hole or recess such for example as that shown in Fig. 4. In this instance the adjusting nut 6 has formed therein a slot 15 open at the interior of said nut, the locking screw 10 being loosely fitted in said slot and held thereby in engagement with the thread of the hub. The locking screw would work as well in such a slot as in a round screw hole. It will be understood that the slot 15 has an open end in the outer end of the adjusting nut and a closed inner end the wall of which provides a suitable seat or abutment against which the inner end of the locking screw can be jammed.

In Fig. 6 there is shown a variable pitch V-belt sheave identical to that shown in Figs. 1 and 2 but having in the adjusting nut thereof two diametrically oppositely arranged locking screws 10, each in the relation to the adjusting nut and thread of the hub hereinbefore described. In some instances it may be desirable to employ two diametrically opposite locking screws, so that if the sheave disc 8 should become slightly canted by the tightening of one of said screws, this may be corrected by tightening the other screw. However a single locking screw is sufficient for effectually locking the adjusting nut to the hub.

Fig. 7 shows a friction clutch of the type disclosed in the patent to Firth et al., No. 2,367,390, of January 16, 1945. The clutch hub 20 carries in driving connection therewith a pair of clamping plates 21 and 22 for clamping an interposed friction disc 23, the plate 22 being axially movable and the plate 21 being held from outward displacement. For closing the clutch, balls 24 are forced by the axially shiftable sleeve 25 between outwardly diverging annular end faces of a stationary abutment member 26 and an axially movable thrust-transmitting member 27, whereby to apply pressure to the clamping plate 22 to effect clamping of the friction disc. The abutment member 26 is shown as an extension from an adjusting nut 28 which is screwed on the threaded portion 29 of the hub. Said adjusting nut is equipped with means embodying the invention for locking it to the hub, said means comprising the locking screw 30 having a thread of the same pitch as that of the hub and interengaged with the latter at longitudinally alined points, the screw so engaged being loosely fitted in a smooth-bored hole in the adjusting nut and adapted to be jammed against a seat formed on said nut by screwing up action. The various statements hereinbefore made with reference to the locking screw 10 are applicable to the locking screw 30.

It will be understood that the invention may be applied to adjusting nuts of various devices other than those herein shown and described.

I claim:

1. In an adjusting means comprising a nut and a threaded member on which it is screwed, a locking means therefor comprising a screw arranged in said nut longitudinally thereof and having a thread of the same pitch as that of said member and interengaged with the thread of said member at longitudinally alined points, said screw so engaging the thread of said member being loosely fitted in a smooth walled recess in said nut, said recess having an open end in the outer end of said nut through which said screw can be inserted by screwing motion, and said nut having at the inner end of said recess an abutment against which said screw can be tightened for locking said nut to said member, said screw being approximately parallel with a plane tangential to said member but in a skewed position such that the interengaging portions of the threads of said screw and member are more nearly in approximate parallelism than if the screw axis were substantially parallel with the axis of said member.

2. An adjusting nut to be screwed on a threaded member and having a means for locking it thereto comprising a screw arranged in said nut longitudinally thereof, said screw having a thread of the same pitch as the nut thread and being so centered that upon screwing the nut on said member longitudinally alined portions of the thread of said screw will come between successive convolutions of the thread of said member, said nut having a smooth walled recess in which said screw when engaging the thread of said member is loosely fitted, said recess having an open end in the outer end of said nut, and said nut having at the inner end of said recess an abutment against which said screw can be tightened for locking said nut to said member, said screw being approximately parallel with a plane tangential to said member but in a skewed position such that the interengaging portions of the threads of said screw and member are more nearly in approximate parallelism than if the screw axis were substantially parallel with the nut axis.

DAVID FIRTH.

REFERENCES CITED

The following references are of record in the file of this patent:

UNITED STATES PATENTS

| Number | Name | Date |
|---|---|---|
| 959,222 | Jacobs | May 24, 1910 |
| 1,599,068 | Swope | Sept. 7, 1926 |
| 1,804,348 | Kubacki | May 5, 1931 |
| 1,816,591 | Kirby | July 28, 1931 |
| 2,386,897 | Johnson | Oct. 16, 1945 |

FOREIGN PATENTS

| Number | Country | Date |
|---|---|---|
| 18,039 | Great Britain | Aug. 19, 1904 |